US010126143B2

(12) United States Patent
Vandanapu

(10) Patent No.: US 10,126,143 B2
(45) Date of Patent: Nov. 13, 2018

(54) NAVIGATION SYSTEM WITH COMMUNICATION MECHANISM AND METHOD OF OPERATION THEREOF

(71) Applicant: Telenav, Inc., Santa Clara, CA (US)

(72) Inventor: Naveen Kumar Vandanapu, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 113 days.

(21) Appl. No.: 15/207,126

(22) Filed: Jul. 11, 2016

(65) Prior Publication Data
US 2018/0010921 A1 Jan. 11, 2018

(51) Int. Cl.
G01C 21/36 (2006.01)
G01C 21/20 (2006.01)
H04L 29/08 (2006.01)

(52) U.S. Cl.
CPC ......... G01C 21/3679 (2013.01); G01C 21/20 (2013.01); H04L 67/14 (2013.01); H04L 67/306 (2013.01)

(58) Field of Classification Search
CPC ... G01C 21/3679; G01C 21/20; H04L 67/306; H04L 67/14
USPC ...................................... 701/1, 425
See application file for complete search history.

(56) References Cited

U.S. PATENT DOCUMENTS

| 9,851,207 | B2* | 12/2017 | Wang | H04L 51/20 |
| 2003/0134648 | A1* | 7/2003 | Reed | H04W 60/00 |
| | | | | 455/456.1 |
| 2007/0281689 | A1* | 12/2007 | Altman | G06Q 30/0207 |
| | | | | 455/435.1 |
| 2007/0281690 | A1* | 12/2007 | Altman | H04W 4/185 |
| | | | | 455/435.1 |
| 2008/0045234 | A1* | 2/2008 | Reed | H04W 8/02 |
| | | | | 455/456.1 |
| 2008/0070593 | A1* | 3/2008 | Altman | H04L 63/102 |
| | | | | 455/457 |
| 2009/0047972 | A1* | 2/2009 | Neeraj | G06Q 10/10 |
| | | | | 455/456.1 |
| 2010/0325194 | A1* | 12/2010 | Williamson | H04W 4/02 |
| | | | | 709/203 |
| 2012/0131183 | A1* | 5/2012 | Heidi | H04L 67/22 |
| | | | | 709/224 |
| 2013/0226453 | A1* | 8/2013 | Trussel | H04L 51/20 |
| | | | | 701/533 |
| 2013/0288716 | A1* | 10/2013 | Kwon | H04W 4/046 |
| | | | | 455/456.3 |
| 2014/0280267 | A1* | 9/2014 | Perlegos | G06F 17/30023 |
| | | | | 707/758 |
| 2014/0365901 | A1* | 12/2014 | Moha | G01C 21/367 |
| | | | | 715/738 |

(Continued)

*Primary Examiner* — Jaime Figueroa
(74) *Attorney, Agent, or Firm* — Perspectives Law Group, Corp.

(57) ABSTRACT

A method of operation of a navigation system includes: determining a POI (point-of-interest) based on comparing a destination description and a POI information for a match; determining a privacy preference for communicating with a device; generating a temporary contact based on the POI and the privacy preference representing an anonymous mode; and establishing a communication session between a contact address and the temporary contact with a control unit based on the privacy preference for communicating with the POI.

20 Claims, 6 Drawing Sheets

(56) References Cited

U.S. PATENT DOCUMENTS

| | | | |
|---|---|---|---|
| 2015/0338219 A1* | 11/2015 | Wang | G01C 21/26 701/537 |
| 2016/0048298 A1* | 2/2016 | Choi | G06F 3/04842 715/846 |
| 2016/0092070 A1* | 3/2016 | Chen | H04W 4/04 345/173 |
| 2016/0259528 A1* | 9/2016 | Foss | G06F 3/0482 |
| 2017/0032143 A1* | 2/2017 | Kong | H04L 63/102 |

* cited by examiner

NAVIGATION SYSTEM WITH COMMUNICATION MECHANISM AND METHOD OF OPERATION THEREOF

TECHNICAL FIELD

The present invention relates generally to a navigation system, and more particularly to a system with communication mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, communicate, and/or consume information in order for users to create, transfer, store, communicate, and consume in the "real world." One such use of location based services is to efficiently communicate the information.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without communication mechanism has become a paramount concern for the consumer. The inability decreases the benefit of using the tool.

Thus, a need still remains for a navigation system with communication mechanism to optimally communicate the communication information for the user. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a POI (point-of-interest) based on comparing a destination description and a POI information for a match; determining a privacy preference for communicating with a device; generating a temporary contact based on the POI and the privacy preference representing an anonymous mode; and establishing a communication session between a contact address and the temporary contact with a control unit based on the privacy preference for communicating with the POI.

The present invention provides a navigation system, including: a control unit for: determining a POI (point-of-interest) based on comparing a destination description and a POI information for a match, determining a privacy preference for communicating with a device, generating a temporary contact based on the POI and the privacy preference representing an anonymous mode, and a communication unit, coupled to the control unit, for establishing a communication session between a contact address and the temporary contact based on the privacy preference for communicating with the POI.

The present invention provides a non-transitory computer readable medium including instructions for execution, the instructions comprising: determining a POI (point-of-interest) based on comparing a destination description and a POI information for a match; determining a privacy preference for communicating with a device; generating a temporary contact based on the POI and the privacy preference representing an anonymous mode; and establishing a communication session between a contact address and the temporary contact with a control unit based on the privacy preference for communicating with the POI.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
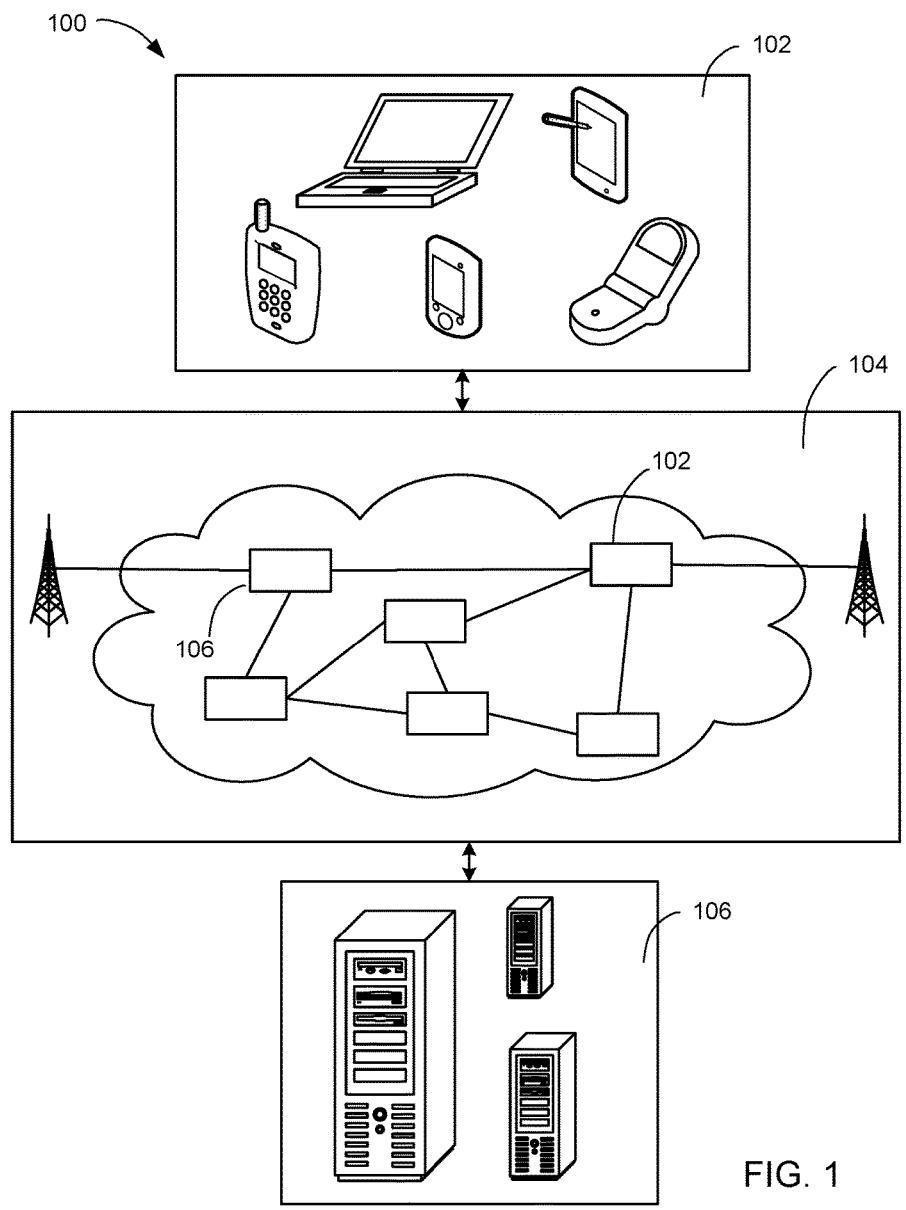
FIG. 1 is a navigation system with communication mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with communication mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
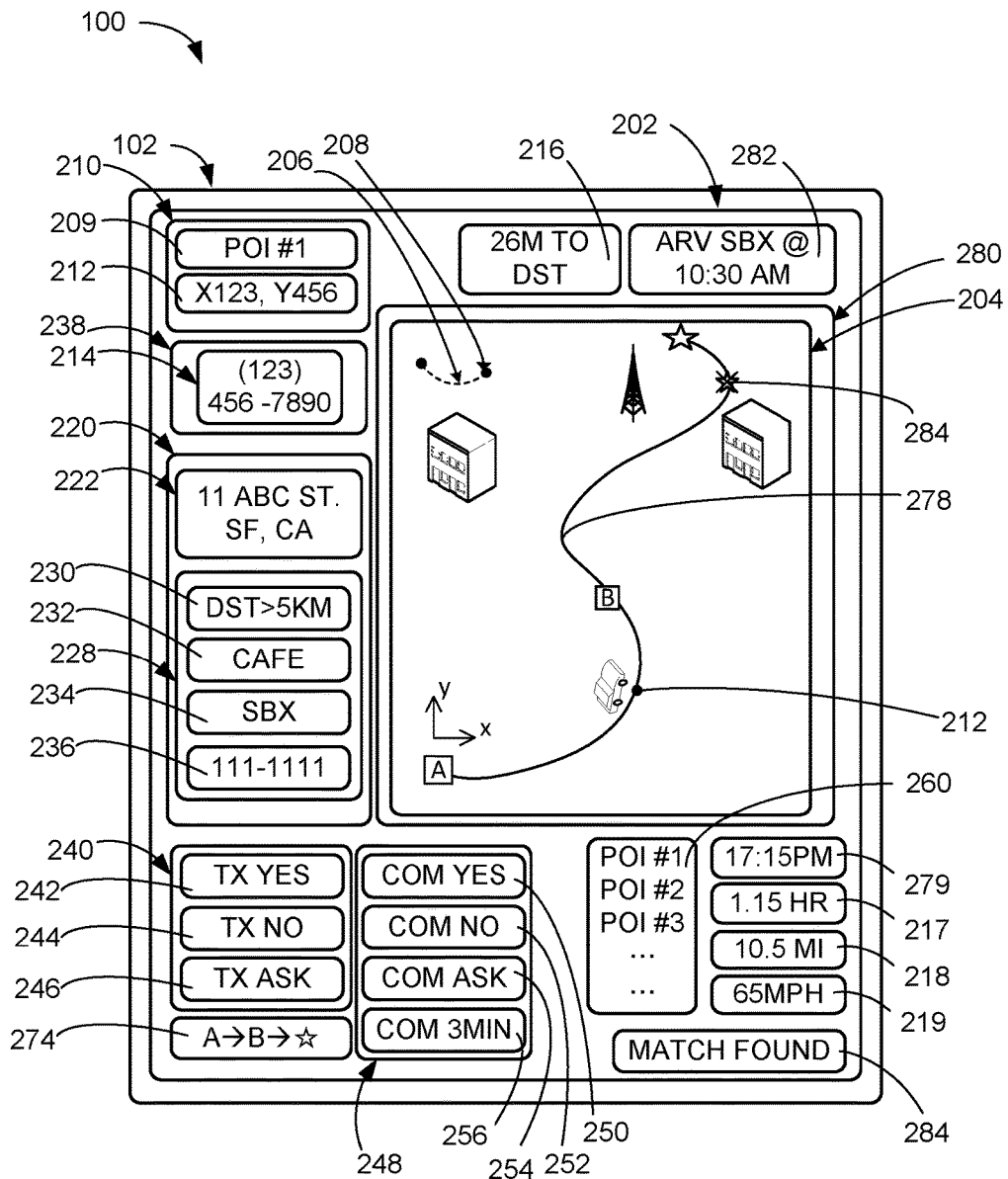
FIG. 2 is an example of a configuration information of the navigation system.

Referring now to FIG. 2, there is shown an example of a configuration information 202 of the navigation system 100. For clarity and brevity, the embodiment of the present invention will be described with the first device 102 delivering the result generated by the navigation system 100. However, the first device 102 and the second device 106 of FIG. 1 can be discussed interchangeably.

The configuration information 202 can be collected and used for configuring the navigation system 100. For example, the configuration information 202 can include a map information 280, a status information 210, a destination description 220, or a combination thereof.

The map information 280 is defined as a diagram or a collection of data representing an arrangement or distribution of a feature on a map 204. Examples of the feature of the map information 280 can include the map 204, a path 206, a road sign, a geographical feature, a natural topology, an entity such as a business, other various infrastructures, or a combination thereof.

The path 206 is defined as a passage connecting a geographic location to another geographic location. For example, the path 206 can be the passage for navigation connecting an instance of a physical location 208 on the map 204 to another instance of the physical location 208 on the map 204.

The physical location 208 is defined as a positional information. For example, the physical location 208 can be represented by a mailing address, a coordinate for GPS, or a combination thereof. For a specific example, in the United States, the mailing address can include information representing the building number, the street name, the city name, the zip code, the state name, or a combination thereof to identify the specific instance of the physical location 208. In a different country, the mailing address can include different information for specifying the physical location 208. For a specific example, in Japan, the mailing address can be composed of a postal code, a prefecture name, a city name, a city-block name, a building number, an addressee's name, or a combination thereof to specify the physical location 208.

In another example, the physical location 208 can be represented by a geographic latitude and longitude based of the two dimensional Cartesian coordinate system. For a specific example, the longitude and the latitude of the physical location 208 can be represented in an ordered pair of (X, Y) for GPS.

The map 204 is defined as a graphical representation of the physical world. For example, the map 204 can be a representation of a spatial relationship between the features of the geographic locations that the map 204 represents.

A POI (point-of-interest) 209 is defined as a feature on the map 204 that occupies an area or point of the map 204. For example, the POI 209 can be referred to as a business, government entity, parks and or a combination thereof on the map 204. For a specific example, the POI 209 can also be referred to as a business such as a gas station, a hotel, a petrol station, or a combination thereof.

The status information 210 can represent a state, a condition, or a combination thereof of the first device 102. For example, the status information 210 can include a current location 212, a device contact 214, a travel time 216, a communication time threshold 217, a travel distance 218, a predicted speed 219, or a combination thereof.

The current location 212 is defined as a current positional information of a device. For example, the current location 212 can represent the physical location 208 of the first device 102 at the current instance of time.

The contact address 238 is defined as the communication address for exchanging information. For example, the contact address 238 can include a telephone number, an IP address, an instant messenger account name, or a combination thereof. For a specific example, the contact address 238 can include the device contact 214, a POI contact 236, or a combination thereof.

The device contact 214 is defined as a communication address a device. For example, the device contact 214 can include a telephone number, an IP address, an instant messenger account name, or a combination thereof. In this example, the information exchanged can include data representing an oral conversation, a text message, or a combination thereof.

The POI contact 236 is defined as a communication address of the POI 209. For example, the POI contact 236 can include a telephone number, an IP address, an instant messenger account name, or a combination thereof for the POI 209.

The travel time 216 is defined as an amount of time required to navigate to the physical location 208. For example, the travel time 216 can represent the amount of time required for a user of the navigation device to reach the destination location 222 from the current location 212 based on the time units in hours, minutes, seconds, or a combination thereof.

The communication time threshold 217 is defined as a time limit used for comparison to establish a network session. For example, the communication time threshold 217 can be used for comparison to establish the network session between the first device 102 and the second device 106. More specifically, the communication time threshold 217 can be used for comparison to establish the communication between a contact address 238 representing the device contact 214 and the contact address 238 and another device. The communication time threshold 217 can represent the minimum time limit or the maximum time limit.

The travel distance 218 is defined as the distance to the physical location 208. For example, the travel distance 218 can represent the distance between the first device 102 and the destination location 222. The travel distance 218 can be the distance between the current location 212 of the first device 102 and the destination location 222 along the path 206 of travel, the rectilinear distance between the current location 212 and the destination location 222, or a combination thereof. For a specific example, the current location 212 in a Cartesian coordinate system can be located at the physical location 208 of x=5 KM, y=10 KM and the destination location 222 can be located at x=15 KM, y=10 KM with the path 206 in a straight line connecting the two. In this specific example, the travel distance 218 can be 10 KM.

The predicted speed 219 is defined as an anticipated speed of travel. For example, the predicted speed 219 can be the anticipated speed of travel for the first device 102 based on a speed limit, a recommended speed, historically driven speed, previous actual travel speed of the user, real-time traffic information, or a combination thereof. For a specific example, the predicted speed 219 representing "60 KPH (Kilometers per hour)" can represent the anticipated speed of the first device 102 traveling at the speed of 60 kilometers per hour.

The destination description 220 is defined as a description for the destination location 222. For example, the destination description 220 can include information related to the destination location 222 including a POI proximity 230, a POI type 232, a POI name 234, the POI contact 236, or a combination thereof.

The destination location 222 is defined as a location of the intended area for where the navigation ends. The destination location 222 can be presented as a mailing address, the Cartesian coordinate, the GPS coordinate, or a combination thereof. For a specific example, the destination location 222 represented in the Cartesian coordinate can be located at (x =15, y =10). In another example, the destination location 222 can be the physical location 208 of the POI 209 intended for navigation. For example, the "B" depicted in FIG. 2 and the star figure depicted in the FIG. 2 can be the determined as the physical location 208 intended as the destination location 222.

The POI proximity 230 is defined as a limit on the travel distance 218 required for comparison to determine the destination location 222. The POI proximity 230 can represent the maximum or minimum instance of the travel distance 218 required. For example, to determine the POI 209 as the destination location 222, the travel distance 218 between the POI 209 and the first device 102 can be required to meet or exceed the POI proximity 230. For a different example, the POI proximity 230 can represent the minimum instance of the travel distance 218 required between the current location 212 and the destination location 222.

For a specific example, the current location 212 can be located at (x=0, y=0) using the Cartesian coordinate. In this specific example, if the POI proximity 230 is determined as a Euclidian distance of 5 KM, the destination location 222 must be located within the Euclidian distance radius of 5 from the physical location 208 representing (x=0, y=0).

The POI type 232 is defined as a classification of the POI 209. The POI type 232 can represent various classifications. For example, the POI type 232 can include a "Café," a "Convenience Store," a "Hardware Store," a "Library," a "Gas Station," a "Winery," an "ATM," or a combination thereof. For a different example, the POI type 232 can also be represented using a Standard Industrial Classification (SIC) standard. Under the SIC standard, the POI type 232 can be represented based on an entity type ID such as 2084 for the Winery and the entity type ID of 3578 for an ATM.

The POI name 234 can be represented in an alphanumeric combination of A to Z, 0 to 9, or a combination thereof. For a specific example, the instances of the POI name 234 can include a "McDonalds™," a "Starbucks™," the "AT&T Park™," or "Home Depot™."

In another example, the configuration information 202 can include a transmission permissibility 240, a communication mode 248, a POI information 260, a route information 274, a navigation notice 282 or a combination thereof.

The transmission permissibility 240 is defined as a result of whether a transmission of the navigation notice 282 is authorized or not. For example, the type of the transmission permissibility 240 can include a permit notification 242, a prohibit notification 244, a query designation transmission 246, or a combination thereof.

The navigation notice 282 is defined as a message notifying the designation of the destination location 222. The navigation notice 282 can include various types of information for notifying the designation of the destination location 222. For example, the navigation notice 282 can include the current location 212, the device contact 214, the transmission permissibility 240, the destination description 220, the communication mode 248, or a combination thereof.

The navigation notice 282 including the transmission permissibility 240 can provide permission for communicating the determination of the destination location 222 as the intended area for navigation. In a different example, the navigation notice 282 including the device contact 214 can provide the communication address of the first device 102 to the second device 106.

The permit notification 242 is defined as the transmission permissibility 240 representing the state of allowing the communication of the navigation notice 282. For a specific example, if the transmission permissibility 240 represents the permit notification 242, the first device 102 can communicate the navigation notice 282 to the second device 106 when the destination location 222 is determined.

The prohibit notification 244 is defined as the transmission permissibility 240 representing the state of prohibiting the transmission of the navigation notice 282. For a specific example, if the transmission permissibility 240 represents the prohibit notification 244, the navigation notice 282 cannot be communicated from the first device 102 when the destination location 222 is determined.

The query designation transmission 246 is defined as the transmission permissibility 240 representing the state of querying the transmission of the navigation notice 282 if the destination location 222 is determined. For a specific example, if the transmission permissibility 240 represents the query designation transmission 246, the operator of the first device 102 can be queried to transmit the navigation notice 282 to the second device 106 when the destination location 222 is determined.

The communication mode 248 is defined as a method of authorizing a communication of a device. For example, the communication mode 248 can include various method of authorizing a communication. For example, the communication mode 248 can include an permit communication 250, a prohibit communication 252, a query communication 254, a timed communication 256, or a combination thereof.

The permit communication 250 is defined as the communication mode 248 for authorizing the communication with another device. For a specific example, if the communication mode 248 represents the permit communication 250, the navigation system 100 can authorize communication between the first device 102 and the second device 106.

The prohibit communication 252 is defined as the communication mode 248 disallowing the device from communicating. For example, if the communication mode 248 represents the prohibit communication 252, the first device 102 can be prohibited from communicating information with the second device 106.

The query communication 254 is defined as the communication mode 248 requiring an authorization for communication. For example, if the communication mode 248 represents the query communication 254, the operator of the first device 102 can be queried to provide the authorization for communication between the first device 102 and the second device 106.

The timed communication 256 is defined as the communication mode 248 for authorizing communication based on time. For example, if the communication mode 248 represents the timed communication 256, the first device 102 can communicate with the second device 106 for a duration of a pre-determined amount of time.

The POI information 260 is defined as the description of the POI 209. For example, the POI information 260 can be used for comparison for determining the POI 209 as the intended area of the navigation. The POI information 260 can include various description of the POI 209. For example, the POI information 260 can include the physical location 208 of the POI 209, the POI type 232, the POI name 234, the POI contact 236, or a combination thereof.

A match 284 is defined as a result where a comparison between at least two elements contains equal or same value. The match 284 can also represent the condition where a value of an element overlaps a value of another element. For example, the navigation system 100 can compare the destination description 220 to the POI information 260. A comparison result of the match 284 can represent element or information within the destination description 220 and the element or information within the POI information 260 can be equal or same.

The route information 274 is defined as an information of a travel route 278. For example, the route information 274 can include the path 206 for the first device 102 to travel. The route information 274 can include the travel route 278, the destination location 222, an estimated arrival time 279, or a combination thereof.

The travel route 278 is defined as the path 206 determined for a device to travel. For example, the travel route 278 can include the path 206 connecting the current location 212, the destination location 222, or a combination thereof. The travel route 278 can also include multiple instances of the destination location 222. For example, the path 206 can represent the travel route 278 connecting the destination location 222 with another instance of the destination location 222. More specifically, the travel route 278 can include the path 206 connecting a first instance of the destination location 222 to a second instance of the destination location 222.

The estimated arrival time 279 is defined as a time expected to arrive at the physical location 208. For example, the estimated arrival time 279 can be represented as a moment of time, a range of time, a duration of time left for navigation, or a combination thereof. For a specific example, the estimated arrival time 279 represented in moment of date and time can present "2015, Jul., 15, 14:00." In another specific example, the estimated arrival time 279 represented in range of time can present "2015, Jul., 15, 13:50 ~14:10." In a different specific example, the estimated arrival time 279 represented in duration of time can present "1 HOUR 33 MINUTES."

Figure 3:
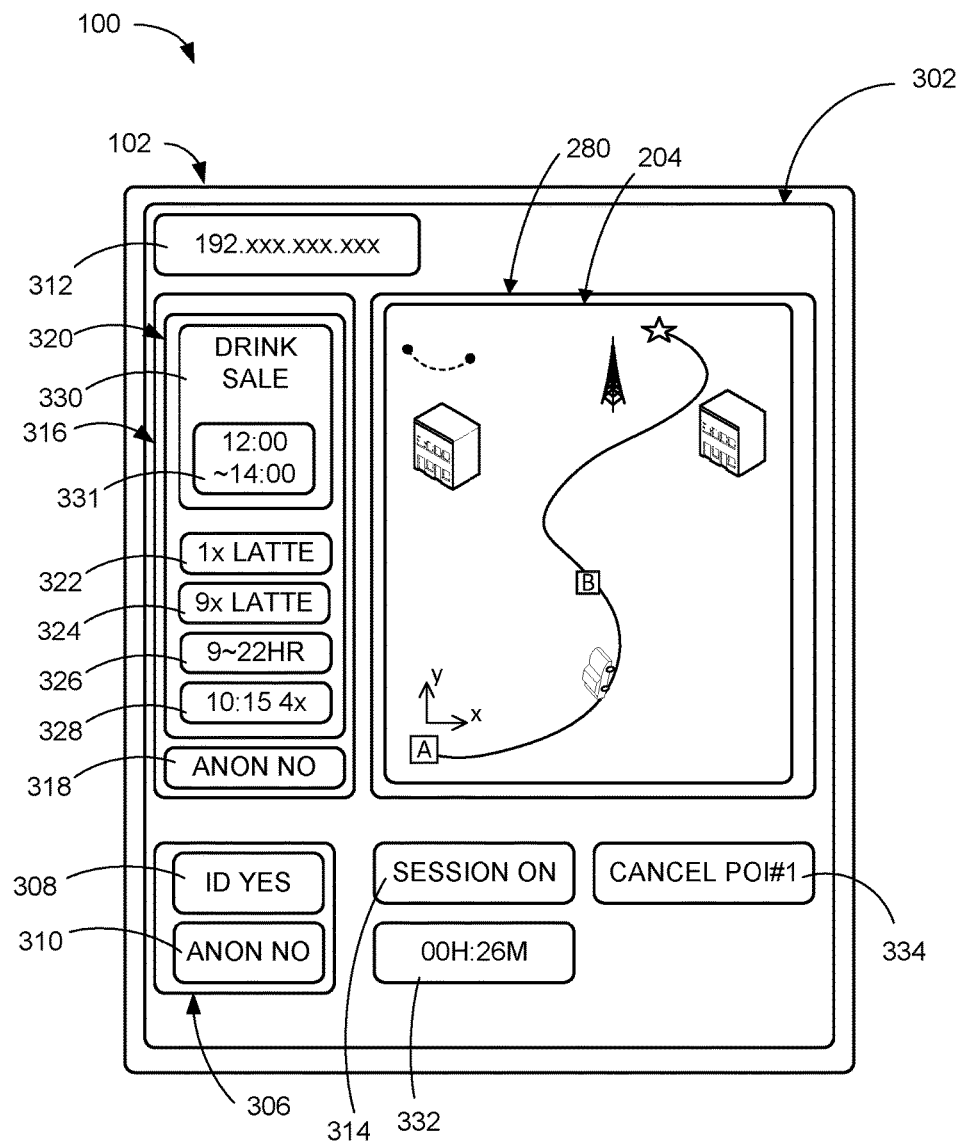
FIG. 3 is an example of a session information of the navigation system.

Referring now to FIG. 3, there is shown an example of a session information 302 of the navigation system 100. For clarity and brevity, the embodiment of the present invention will be described with the first device 102 delivering the result generated by the navigation system 100. However, the first device 102 and the second device 106 of FIG. 1 can be discussed interchangeably.

The session information 302 is defined as an information for establishing communication between devices. For example, the session information 302 can include a privacy preference 306, a temporary contact 312, a session duration 332, a communication session 314, a communication information 316, or a combination thereof.

The privacy preference 306 is defined as a configuration to set visibility of the first device 102 to other device. For example, the privacy preference 306 can represent the setting of the first device 102 to remain anonymous or identifiable to other device based on various types of the privacy preference 306. For example, the communication session 314 can be established based on the privacy preference 306 representing an identifiable mode 308, an anonymous mode 310, or a combination thereof.

The identifiable mode 308 is defined as the configuration allowing the identification of a device. For example, a device with the privacy preference 306 representing the identifiable mode 308 can provide the identification information of the first device 102 to another device. For a specific example, identification information of the first device 102 can include the current location 212 of FIG. 2, the device contact 214 of FIG. 2, or a combination thereof.

The anonymous mode 310 is defined as the configuration preventing the identification of a device. For example, a device with the privacy preference 306 representing the anonymous mode 310 can prevent the transmission of the identification information of the first device 102 to another device. In this example, the first device 102 can establish the communication session 314 with a second device 106 without transmitting its identification information such as the device contact 214. For a specific example, the first device 102 can use the temporary contact 312 as the communication proxy to establish the communication session 314 without providing the device contact 214 of the first device 102 to the second device 106.

The temporary contact 312 is defined as a communication proxy for forwarding the communication information 316. For example, the temporary contact 312 can represent a telephone number, an IP address, an instant messaging account name, or a combination thereof. For a specific example, the temporary contact 312 can be an IP address of a communication proxy server for forwarding the communication information 316 between the IP address of the first device 102 and the IP address of the second device 106. In a different specific example, the temporary contact 312 can be a phone number of a switch for the Public Switched Telephone Network (PSTN) for forwarding the communication information 316 between the phone number of the first device 102 and the phone number of the second device 106.

The session duration 332 is defined as an amount of time the communication session 314 is established. For example, the session duration 332 can be the amount of time the communication session 314 is established for between the first device 102 and the second device 106.

The communication session 314 is defined as a state of interactive exchange of information. The communication session 314 can be established to allow the device to communicate through the communication path 104 of FIG. 1. For example, the communication session 314 can represent the first device 102 transmitting the communication information 316 to the second device 106 through the communication path 104. In another example, the communication session 314 can represent the first device 102 receiving the communication information 316 generated by the second device 106 through the communication path 104.

The communication information 316 is defined as an information of a conversation, a transaction, or a combination thereof. For example, the communication information 316 can include a natural language conversation 318, a transactional communication 320, or a combination thereof.

The natural language conversation 318 is defined as a communication based on a language used by human. For example, the natural language conversation 318 can include a speech, a writing, a movement (such as sign language), touching, or a combination thereof.

The transactional communication 320 is defined as an exchange of the information for conducting a transaction. For example, the transactional communication 320 can include an exchange of an order information 322, an inventory information 324, a POI availability 326, a reservation information 328, an accessory information 330, a time range 331, or a combination thereof.

The order information 322 is defined as an offer or an acceptance of a transaction. For example, the order information 322 can include a purchase order, a rental order, a service order, a sales order, or a combination thereof. For a specific example, the order information 322 can represent a purchase request from the POI 209 of FIG. 2 at the destination location 222 of FIG. 2.

The inventory information 324 is defined as an availability of a product or a service at the POI 209. For example, the inventory information 324 can represent the available type and quantity of a product available for transaction. In a different example, the inventory information 324 can represent the type of a service available including a hotel room, a massage at a spa, or a combination thereof.

The POI availability 326 is defined as a time period for accepting communication by the POI 209. For example, the POI availability 326 can include the availability of the POI 209 to communicate the communication information 316 during specific range of time and date. In another example, the POI availability 326 can include the availability of the POI 209 for transaction based on range of time and date.

The reservation information 328 is defined as an arrangement for providing future service, transfer of product, or a combination thereof. For example, the reservation information 328 can represent the arrangement such as securing a seating at a restaurant. In a different example, the reservation information 328 can represent the arrangement for transferring a product for purchase, lease, sale, or a combination thereof for future delivery.

The accessory information 330 is defined as information supplementing the communication information 316. For example, the accessory information 330 can include various information associated with the POI 209. For a specific example, the accessory information 330 can include a franchise information of the POI 209. In this specific example, the accessory information 330 including the franchise information can identify the franchise that the POI 209 belongs to. In a different example, the accessory information 330 can represent an information indicating a promotion provided by the POI 209.

The time range 331 is defined as a span of time. For example, the time range 331 can represent the span of time representing a beginning and an end of an availability of the accessory information 330. For a specific example, the time range 331 can represent the span of time when the accessory information 330 representing a special promotion is available. For example, a happy hour promotion can be included in the accessory information 330 during specific instance of the time range 331 for the POI 209 such as a restaurant.

A cancellation notice 334 is defined as a notification indicating a removal 284 of the destination location 222 as the area intended for navigation. The removal 284 is defined as a result or condition of element being eliminated. For example, the cancellation notice 334 can inform the removal 284 of the destination location 222 to eliminate the destination location 222 from the travel route 278 of FIG. 2.

Figure 4:
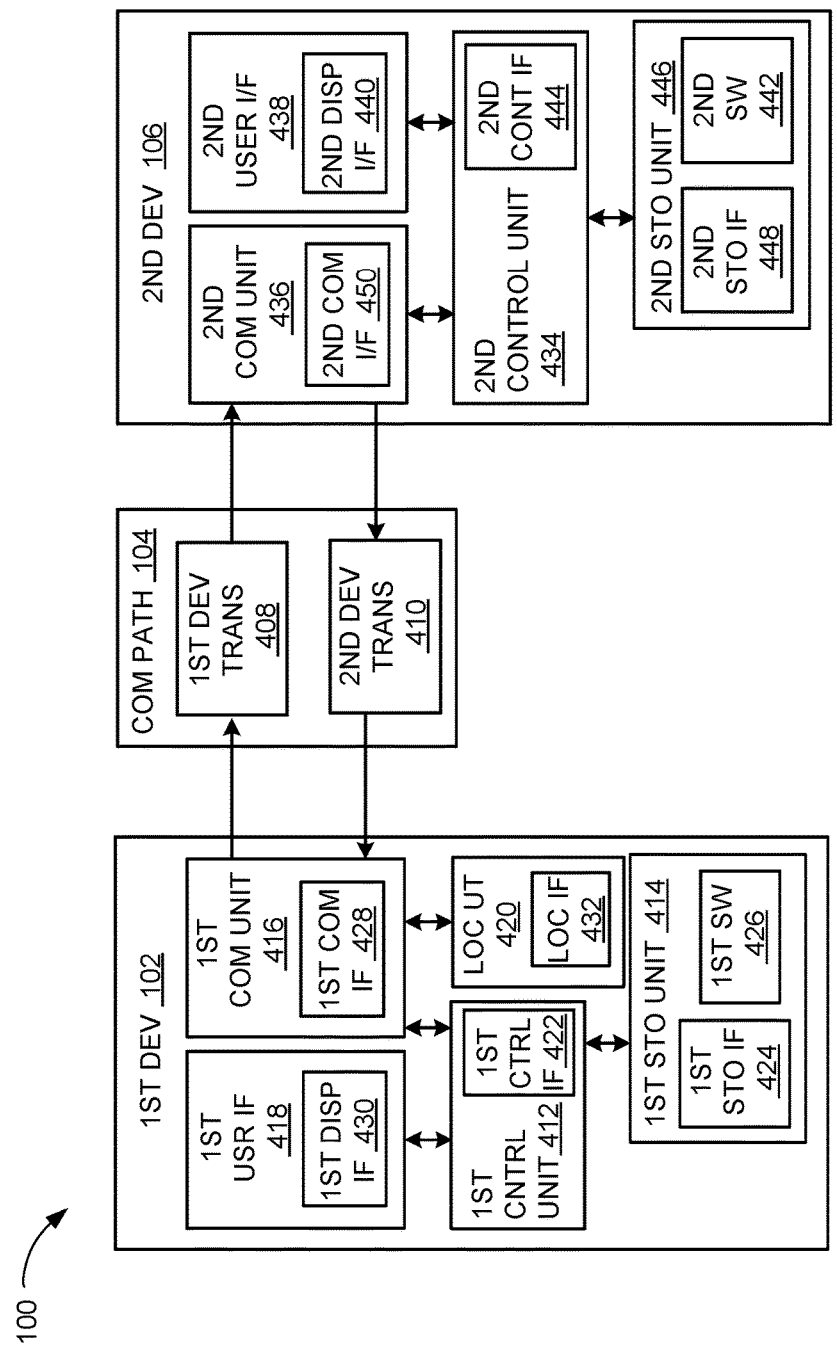
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a GPS, an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 336 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
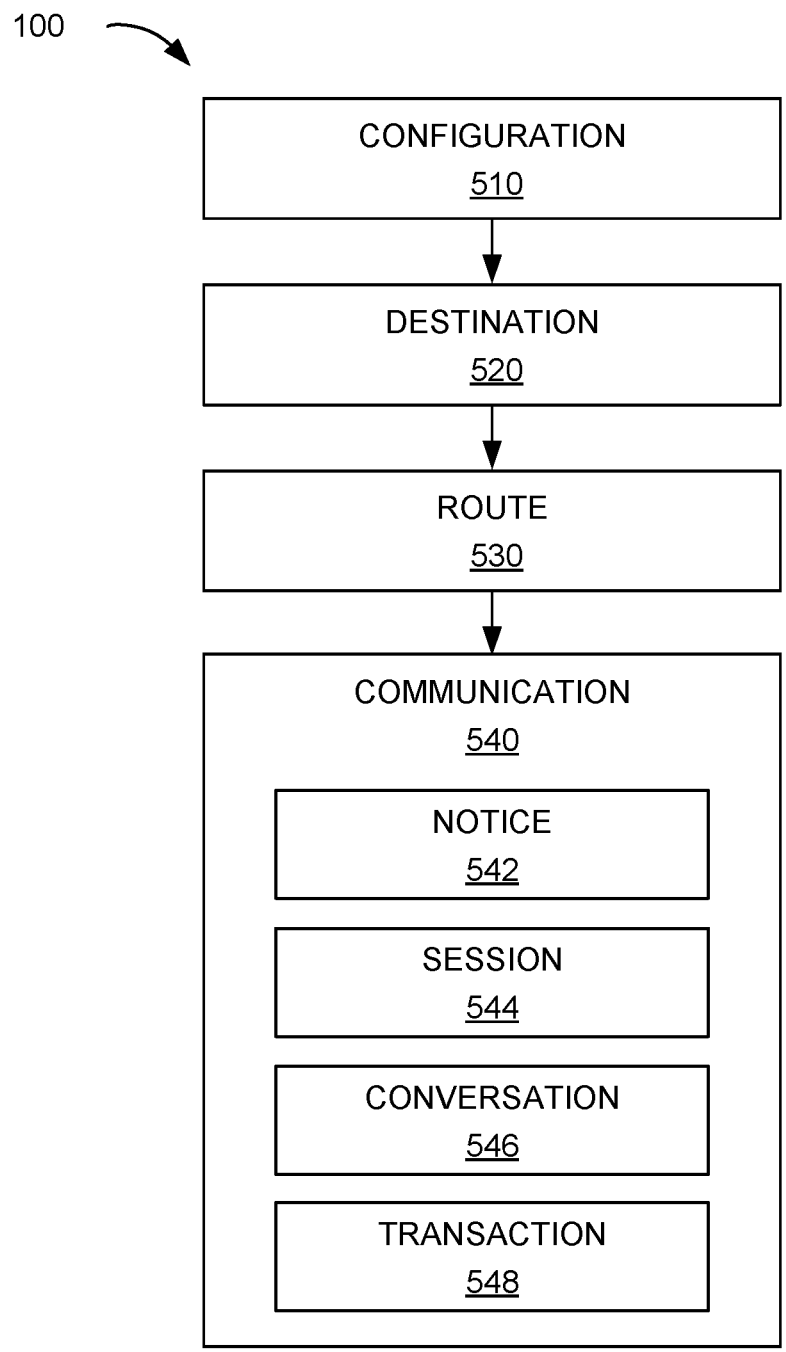
FIG. 5 is a control flow of the navigation system.

Referring now to FIG. 5, therein is shown a control flow of the navigation system 100. The navigation system 100 can include a configuration module 510. The configuration module 510 configures the navigation system 100.

The configuration module 510 can configure the navigation system 100 in various ways. For example, the configuration module 510 can configure the navigation system 100 based on the configuration information 202 of FIG. 2, the session information 302 of FIG. 3, or a combination thereof. For a different example, the configuration module 510 can determine the configuration information 202 including the map information 280 of FIG. 2, the status information 210 of FIG. 2, the destination description 220 of FIG. 2, or a combination thereof for configuring the navigation system 100.

The configuration module 510 can determine the map information 280 including the map 204 of FIG. 2 in various ways. For example, the configuration module 510 can determine the map information 280 from the features included in the map 204. For a specific example, the configuration module 510 can extrapolate the features representing the map information 280 including the path 206 of FIG. 2, the POI 209 of FIG. 2, the road sign, the traffic signal, the highway entrance, the highway exits, or a combination thereof from the map 204.

In this specific example, the configuration module 510 can scan the map 204 to extrapolate the map information 280. For example, the configuration module 510 can scan the map 204 for the feature to extrapolate the map information 280 including the physical location 208 of FIG. 2 of the elements of the map 204. In a specific example, the configuration module 510 can scan and extrapolate the map information 280 representing the traffic signal and the physical location 208 of the traffic signal. In a different example, the configuration module 510 can scan and extrapolate the map information 280 representing the POI 209 with the physical location 208 of the POI 209.

The configuration module 510 can determine the status information 210 including the current location 212 of FIG. 2, the device contact 214 of FIG. 2, the travel time 216 of FIG. 2, or a combination thereof in a number of ways. For example, the configuration module 510 can determine the physical location 208 representing the current location 212 based on a GPS, a position beacon, an inertial measurement unit (IMU), or a combination thereof. In this example, the configuration module 510 can determine the current location 212 with a GPS signal, the physical location 208 retrieved by the position beacon, the movement tracked by an inertial measurement, or a combination thereof determined by the location unit 420 of FIG. 4.

In a different example, the configuration module 510 can determine the device contact 214 representing an IP address, the phone number, or a combination thereof. The configuration module 510 can determine the device contact 214 in various ways. For example, the configuration module 510 can retrieve the device contact 214 stored the first storage unit 414 of FIG. 4, communicated through the first communication unit 416 of FIG. 4 to the first device 102 from the external source, or a combination thereof for determining the device contact 214.

In a different example, the configuration module 510 can capture the alphanumeric value of A to Z, 0 to 9, or a combination thereof representing the device contact 214 entered on the first user interface 418 of FIG. 4. In this specific example, the configuration module 510 can capture "xxx-xxx-xxxx" representing the phone number assigned to the first device 102 of FIG. 1. In another specific example, the configuration module 510 can determine the device contact 214 based on capturing the alphanumeric combination of "192.168.0.1" representing the IP address assigned to the first device 102 for determining the device contact 214.

For a different example, the configuration module 510 can determine the status information 210 representing the travel time 216. For example, the configuration module 510 can determine the travel time 216 based on a current speed and a distance between the current location 212 and the destination location 222 of FIG. 2 along the travel route 278 of FIG. 2. In this example, the configuration module 510 can divide the distance between the current location 212 and the destination location 222 along the travel route 278 with the current speed to determine the travel time 216.

The configuration module 510 can determine the destination description 220 representing the destination location 222 in a number of ways. For example, the configuration module 510 can capture the destination location 222 from the user entry made on the first user interface 418, retrieve the destination location 222 communicated through the first communication unit 416 to the first device 102 from the external source, retrieve the destination location 222 stored in the first storage unit 414, or a combination thereof. For a specific example, the configuration module 510 can capture the alphanumeric value of 0 to 9, A to Z, or a combination thereof representing the destination location 222 at the first user interface 418. For a different specific example, the configuration module 510 can retrieve the alphanumeric value of 0 to 9, A to Z, or a combination thereof representing the destination location 222 through the first communication unit 416, the first storage unit 414, or a combination thereof.

In these examples, the destination location 222 can be based on the mailing address, Cartesian coordinate, or a combination thereof. For example, the configuration module 510 can capture or retrieve an ordered pair representing a Cartesian coordinate of the destination location 222. For a specific example, the configuration module 510 can capture or retrieve the GPS coordinate of "37.795029, −122.393087" for the Ferry Building Market Place in San Francisco, Calif. (CA) as the destination location 222. In a different example, the configuration module 510 can capture or retrieve the alphanumeric combination of "1 Ferry building, San Francisco, Calif. 94111" representing the mailing address of the Ferry Building Market Place in San Francisco, Calif. as the destination location 222.

In a different example, the configuration module 510 can capture the destination description 220 representing the POI proximity 230 of FIG. 2, the POI type 232 of FIG. 2, the POI name 234 of FIG. 2, the POI contact 236 of FIG. 2, or a combination thereof based on optical character recognition. For example, the configuration module 510 can capture the alphanumeric combination "UNDER 5 KM" representing the POI proximity 230 for configuring the navigation device 100. In a different example, the configuration module 510 can capture "CAFE" representing the POI type 232. In another example, the configuration module 510 can capture "STARBUCKS" representing the POI name 234. In a further example, the configuration module 510 can capture the "999-999-9999" representing the POI contact 236.

The configuration module 510 can also determine the configuration information 202 including the transmission permissibility 240, the communication mode 248, or a combination thereof in various ways. For example, the configuration module 510 can capture the transmission permissibility 240 from the user entry made on the first user interface 418, retrieve the transmission permissibility 240 communicated through the first communication unit 416 to the first device 102 from the external source, retrieve the transmission permissibility 240 stored in the first storage unit 414, or a combination thereof.

For a specific example, the configuration module 510 can capture the alphanumeric value of 0 to 9, A to Z, or a combination thereof representing the transmission permissibility 240 at the first user interface 418. For a different specific example, the configuration module 510 can retrieve the transmission permissibility 240 through the first communication unit 416, stored on the first storage unit 414, or a combination thereof. In these examples, the configuration module 510 can determine the transmission permissibility 240 representing the permit notification 242 of FIG. 2, the prohibit notification 244 of FIG. 2, the query designation transmission 246 of FIG. 2, or a combination thereof.

For a different example, the configuration module 510 can capture the communication mode 248 at the first user interface 418. For a specific example, the configuration module 510 can capture the alphanumeric value of 0 to 9, A to Z, or a combination thereof representing the communication mode 248 entered at the first user interface 418. For a different specific example, the configuration module 510 can retrieve the communication mode 248 communicated through the first communication unit 416 to the first device 102 from the external source, stored on the first storage unit 414, or a combination thereof. In these examples, the configuration module 510 can determine the communication mode 248 representing the permit communication 250 of FIG. 2, the prohibit communication 252 of FIG. 2, the query communication 254 of FIG. 2, the timed communication 256 of FIG. 2, or a combination thereof.

In another example, the configuration module 510 can determine the session information 302 representing the privacy preference 306 of FIG. 3, the session duration 332 of FIG. 3, generate the temporary contact 312 of FIG. 3, or a combination thereof.

The configuration module 510 can determine the session information 302 including the privacy preference 306 representing the identifiable mode 308 of FIG. 3, the anonymous mode 310 of FIG. 3, or a combination thereof based on the user preference. For example, the configuration module 510 can capture the user preference for determining the privacy preference 306 representing the identifiable mode 308, the anonymous mode 310, or a combination thereof entered at the first user interface 418. In a different example, the configuration module 510 can retrieve the user preference for determining the privacy preference 306 communicated through the first communication unit 416 to the first device 102 from the external source, stored on the first storage unit 414, or a combination thereof.

For a specific example, the configuration module 510 can capture the alphanumeric value of 0 to 9, A to Z, or a combination thereof representing the privacy preference 306 entered at the first user interface 418. For a different specific example, the configuration module 510 can retrieve the privacy preference 306 communicated through the first communication unit 416 to the first device 102 from the external source, stored on the first storage unit 414, or a combination thereof. In these examples, the configuration module 510 can determine the privacy preference 306 as the identifiable mode 308, the anonymous mode 310, or a combination thereof.

The configuration module 510 can determine the session duration 332 in various ways. For example, the configuration module 510 can determine the session duration 332 based on the travel time 216. In this example, the configuration module 510 can determine the duration representing the travel time 216 as the session duration 332. In a different example, the configuration module 510 can determine the session duration 332 based on capturing the alphanumeric value of A to Z, 0 to 9, or a combination entered at the first user interface 418. In a specific example, the configuration module 510 can capture "10 min" representing the session duration 332 from the first user interface 418. In this specific example, the configuration module 510 can determine the communication session 314 between the first device 102 and the second device 106 for 10 minutes.

The configuration module 510 can generate the temporary contact 312 in various ways. For example, the configuration module 510 can generate the temporary contact 312 for establishing the communication session 314 based on the privacy preference 306. For a specific example, the configuration module 510 can generate the temporary contact 312 for establishing the communication session 314 based on the privacy preference 306 representing the anonymous mode 310. In a different specific example, the configuration module 510 can abstain from generating the temporary contact 312 based on the privacy preference 306 representing the identifiable mode 308. In a further specific example, the configuration module 510 can generate the temporary contact 312 based on the session duration 332. In this specific example, the configuration module 510 can generate the temporary contact 312 for the duration of the session duration 332.

The navigation system 100 can include a destination module 520, which can couple to the configuration module 510. The destination module 520 determines the route information 274 of FIG. 2 of the navigation system 100. For example, the destination module 520 can determine the route information 274 representing the destination location 222 in various ways.

For example, the destination module 520 can capture the alphanumeric value of 0 to 9, A to Z, or a combination thereof representing the destination location 222 from the entry made on the first user interface 418. For a different example, the destination module 520 can retrieve the alphanumeric value of 0 to 9, A to Z, or a combination thereof representing the destination location 222 communicated through the first communication unit 416 to the first device 102 from the external source, stored on first storage unit 414, or a combination thereof.

In an alternative example, the destination module 520 can compare the destination description 220 and the POI information 260 of FIG. 2 for determining the destination location 222. For example, the destination module 520 can compare the POI proximity 230, the POI type 232, the POI name 234, the POI contact 236, or a combination thereof from the destination description 220 and the POI information 260 for the match 284. In this example, the destination module 520 can determine the physical location 208 of the POI 209 with the match 284 between the POI information 260 and the destination description 220 as the destination location 222 intended for navigation. In a different example, based on the match 284 between the destination description 220 and a multiple instances of the POI 209, the destination module 520 can determine the physical location 208 of the POI 209 with a greatest number of instances of the match 284 as the destination location 222.

For a specific example, the destination module 520 can retrieve the destination description 220 including the "Less than 6 kilometers" representing the POI proximity 230, the "Café" representing the POI type 232, and the "Starbucks" representing the POI name 234 for the first instance of the POI 209 using string matching algorithm. Continuing in this specific example, the destination module 520 can retrieve the POI information 260 representing "1704 Oakland Rd #400, San Jose, Calif., 95131" as the destination location 222 based on the mailing address, "Café" representing the POI type 232, and the "Starbucks" representing the POI name 234 for the first instance of the POI 209 using string matching algorithm. The destination module 520 can also retrieve "2 kilometers" as the POI proximity 230 based on the distance between the current location 212 and the physical location 208 of the first instance of the POI 209.

Continuing further in this specific example, the destination module 520 can also retrieve the POI information 260 for the second instance of the POI 209. The POI information 260 from the second instance of the POI 209 can include "670 River Oaks Pkwy, San Jose, Calif. 95134" representing the destination location 222 from its mailing address, "Café" representing the POI type 232, and "Starbucks" representing the POI name 234. The destination module 520 can also determine "8 kilometers" as the POI proximity 230 based on the distance between the current location 212 and the physical location 208 of the second instance of the POI 209.

In this specific example, the destination module 520 can compare the destination description 220 and the POI information 260 of the first instance of the POI 209 to determine three instances of the match 284. Continuing in this specific example, the destination module 520 can determine two instances of the match 284 between the destination description 208 and the POI information 260 of the second instance of the POI 209. In this example, the destination module 520 can determine the "670 River Oaks Pkwy, San Jose, Calif., 95134" from the first instance of the POI 209 as the destination location 222 since the first instance of the POI 209 had greater number of instances of the match 284 between the POI information 260 and the destination description 220 in comparison to the second instance of the POI 209.

In a different example, the destination module 520 can determine the destination location 222 based on capturing the input by the user at the first user interface 418. In this example, the destination module 520 can capture the input of the POI 209, selection of an instance of the physical location 208 from the map 204, or a combination thereof as the destination location 222.

The navigation system 100 can include a route module 530, which can couple to the destination module 520. The route module 530 determines the travel route 278 of the navigation system 100. For example, the route module 530 can determine the travel route 278 based on the current location 212 and the destination location 222.

In this example, the route module 530 can determine the travel route 278 based on connecting the path 206 between the physical location 208 representing the current location 212 and the physical location 208 representing the destination location 222. For a specific example, the route module 530 can retrieve the current location 212 denoted as a vehicle of FIG. 2 and the destination location 222 denoted as "B" of FIG. 2. In this example, the configuration module 510 can determine the path 206 located between the vehicle and the "B" representing the physical location 208 as the travel route 278. For a different specific example, the route module 530 can further retrieve the destination location 222 denoted as the star figure of FIG. 2. In this example, the configuration module 510 can determine the path 206 connecting the vehicle, the "B", and the star as the travel route 278.

In a different example, the route module 530 can determine the estimated arrival time 279 of FIG. 2. In this example, the route module 530 can determine the travel time 216 based on the travel distance 218 of FIG. 2 and the predicted speed 219 of FIG. 2. For a specific example, based on the travel distance 218 of 10 KM and the predicted speed 219 along the travel route 278 of 100 kilometers per hour, the travel time 216 can be determined as 6 minutes. Alternatively, the route module 530 can further determine the estimated arrival time 279 based on the travel time 216 determined with the current speed and the distance between the first device 102 and the destination location 222.

The navigation system 100 can include a communication module 540, which can couple to the route module 530. The communication module 540 communicates various information of the navigation system 100 between devices. For example, the communication module 540 can communicate the configuration information 202, the session information 302, the communication information 316 of FIG. 3, or a combination thereof of the navigation system 100. More specifically, the communication module 540 can communicate the configuration information 202, the session information 302, the communication information 316, or a combination thereof between the first device 102 and the second device 106.

The communication module 540 is not limited to communicating only the information presented above. For example, the communication module 540 can further communicate other information including the contact address 238, the transmission permissibility 240 of FIG. 2, the communication mode 248, or a combination thereof. In another example, the communication module 540 can also communicate the POI information 260, the route information 274, the navigation notice 282, the privacy preference 306, the temporary contact 312, the cancellation notice, or a combination thereof.

The communication module 540 can include a notice module 542. The notice module 542 notifies the determination of the destination location 222. For example, the notice module 542 can notify the determination of the destination location 222 by communicating the navigation notice 282. The notice module 542 can communicate the navigation notice 282 in various ways.

For example, the notice module 542 can generate the navigation notice 282 based on the determination of the physical location 208 of the POI 209 as the destination location 222. In this example, the notice module 542 can generate the navigation notice 282 based on combining the current location 212, the device contact 214, the communication mode 248, the transmission permissibility 240, or a combination thereof.

Continuing with this example, the notice module 542 can communicate the navigation notice 282 to the POI contact 236. In a specific example, the notice module 542 can communicate the navigation notice 282 to the POI contact 236 based on the transmission permissibility 240 representing the permit notification 242 of FIG. 2 and the determination of the destination location 222 for navigation. Furthermore, the notice module 542 can abstain from communicating the navigation notice 282 to the POI contact 236 based on the transmission permissibility 240 representing the prohibit notification 244 of FIG. 2.

It has been discovered that the navigation system 100 communicating the navigation notice 282 to the POI 209 improves the user experience. For example, the first device 102 communicating the navigation notice 282 to the second device 106 when the destination location 222 is determined allows the POI 209 to prepare prior to the users arriving.

For a specific example, the POI 209 such as a restaurant can communicate a response to the first device 102 that the restaurant is currently full and unless a reservation was made, the seating time can be 2 hours or more. In addition, a restaurant can review their current staffing situation to consider requesting additional help before the customers arrive. As a result, the navigation system 100 can improve the user experience by allowing the user of the first device 102 to consider different restaurant before arriving at the POI 209 and prevent lost time from navigating to another restaurant. In addition, the restaurant can request additional help before the customers arrive to prepare ahead to prevent overloading the restaurant's operation capacity in order to ensure a good experience for the customer.

In addition, it has been discovered that the navigation system 100 communicating the navigation notice 282 including the device contact 214, the communication mode 248, or a combination thereof improves the safety of operating the navigation system 100. For example, communicating the navigation notice 282 including the device contact 214 provides information necessary for the second device 106 to contact the first device 102. Continuing in this example, the communication mode 248 can also provide a permission to the second device 106 for contacting the first device 102 when the driving condition is safe. As a result, the navigation system 100 can improve the safety of operating the first device 102 by preventing the user from having a conversation when the driving condition is hazardous.

In a different specific example, the notice module 542 can communicate the navigation notice 282 to the POI contact 236 based on the transmission permissibility 240 representing the query designation transmission 246 of FIG. 2. In this specific example, the notice module 542 can ask the user of the first device 102 for a permission to communicate the navigation notice 282 to other device. If the notice module 542 receives the permission to communicate from the user, the navigation notice 282 can be communicated by the first device 102. To the contrary, if the notice module 542 does not receive a permission to communicate with other device, the navigation notice 282 may not be communicated by the first device 102.

In a further example, the notice module 542 can communicate the travel time 216 to the POI contact 236 in various ways. For example, the notice module 542 can communicate the travel time 216 to the POI contact 236 based on the determination of the POI 209 for navigation. Alternatively, the notice module 542 can communicate the travel time 216 to the POI contact 236 based on the determination of the physical location 208 of the POI 209 for navigation and the transmission permissibility 230 representing the permit notification 242.

In another example, the notice module 542 can compare the estimated arrival time 279 and the time range 331 of FIG. 3 included in the accessory information 330 of FIG. 3 for communicating the accessory information 330. For example, the notice module 542 can communicate the accessory information 330 based on determining the match 284 between the estimated arrival time 279 and the time range 331 included in the accessory information 330. For a specific example, the estimated arrival time 279 can be determined as 1:00 PM, and the time range 331 of the accessory information 330 representing a "lunch time special" at the POI 209 can represent "11:00 AM~14:00." In this specific example, the notice module 542 can compare the estimated arrival time 279 and the time range 331 for the match 284. Based on determining the match 284, the notice module 542 can communicate the accessory information 330 to the temporary contact 312. For a different specific example, the estimated arrival time 279 can alternatively be determined as 2:30 PM. In this specific example, the notice module 542 can refrain from communicating the accessory information 330 to the temporary contact based on the discrepancy between the time range 331 of the accessory information 330 and the estimated arrival time 279. In these examples, the match 284 in time is not required and some overlap will suffice as the match 284 between the estimated arrival time 279 and the time range 331.

The communication module 540 can include a session module 544. The session module 544 establishes the communication session 314 of the navigation system 100. The session module 544 can establish the communication session 314 in various ways. For example, the session module 544 can establish the communication session 314 based on the privacy preference 306, the communication mode 248, the contact address 238 of FIG. 2, or combination thereof.

For a specific example, the session module 544 can establish the communication session 314 based on the privacy preference 306 representing the identifiable mode 308, the anonymous mode 310, or a combination thereof. For example, the session module 544 can establish the communication session 314 based on the privacy preference 306 representing the identifiable mode 308. In this example, the session module 544 can communicate the contact address 238 of the first device 102 representing the device contact 214 to the second device 106 for establishing the communication session 314 when the physical location 208 of the POI 209 is determined as the destination location 222.

In a different specific example, the session module 544 can communicate the contact address 238 of the second device 106 representing the POI contact 236 to the first device 102 for establishing the communication session 314. In this specific example, the session module 544 can establish the communication session 314 based on communicating the request for establishing the communication session 314 to the POI contact 236 of the second device 106.

In a different example, the session module 544 can establish the communication session 314 based on the privacy preference 306 representing the anonymous mode 310. In this example, the session module 544 can establish the communication session 314 between the first device 102 and the second device 106 without disclosing the contact address 238 representing the device contact 214, the POI contact 236, or a combination thereof to the other device.

In a further example, the session module 544 can relay an information between the device contact 214 and the POI contact 236 between in the communication path 104 of FIG. 1 through the temporary contact 312. For a specific example, the first device 102 can transmit the communication information 316 to the temporary contact 312 based on the privacy preference 306 representing the anonymous mode 310. Based on the temporary contact 312 receiving the communication information 316, the navigation system 100 can forward the communication information 316 to the POI contact 236 of the second device 106.

Alternatively, the second device 106 can transmit the communication information 316 to the temporary contact 312 located between the device contact 214 and the POI contact 236 in the communication path 104. After the communication information 316 transmitted by the second device 106 is received by the temporary contact 312, the navigation system 100 can forward the communication information 316 to the first device 102 at the device contact 214.

It has been discovered that the navigation system 100 generating the temporary contact 312 for forwarding the communication information 316 improves the anonymity in the operation of the first device 102, the navigation system 100, or a combination thereof. More specifically, as an example, the session module 544 can generate the temporary contact 312 as a proxy for forwarding and communicating the communication information 316 between the device contact 214 and the POI contact 236. As a result, the navigation system can improve the anonymity for operating the first device 102, the navigation system 100, or a combination thereof by withholding the disclosure of the device contact 214 to each other.

In another example, the session module 544 can establish the communication session 314 based on the communication mode 248. For example, the session module 544 can establish the communication session 314 based on the communication mode 248 representing the permit communication 250 and the determination of the destination location 222 of the POI 208. In this example, the session module 544 can establish the communication session 314 between the first device 102 and the second device 106 based on the communication mode 248 representing the permit communication 250 when the destination location 222 of the POI 209 is determined.

It has been discovered that the navigation system 100 initiating the communication session 314 based on the communication mode 248 representing the permit communication 250 improves the safety of operating the first device 102. More specifically, for example, the user of the first device 102 can determine whether to automatically establish the communication session 314 between the first device 102 and the second device 106 when the destination location 222 is determined. More specifically as an example, the navigation system 100 significantly improves the capability and operation of the first control unit 412 of FIG. 4, the second control unit 434 of FIG. 2, or a combination thereof to control the execution of whether to initiate the communication session 314 based on the destination location 222 being determined. As a result, the navigation system 100 can establish the communication session 314 automatically, for example, while driving, when the communication mode 248 represents the permit communication 250 for improving the safety of operating the first device 102 by reducing the distraction while driving, increasing flexibility of allocating computer memory, or a combination thereof.

In a different specific example, the session module 544 can determine to not establish the communication session 314 based on the communication mode 248 representing the prohibit communication 252 of FIG. 2. In this example, based on the communication mode 248 representing the prohibit communication 252, the session module 544 can refrain from automatically establishing the communication session 314 between the first device 102 and the second device 106 when the destination location 222 is determined.

In another specific example, the session module 544 can establish the communication session 314 based on the communication mode 248 representing the query communication 254 of FIG. 2. In this specific example, the session module 544 can query the operator of the navigation system 100 for a permission to establish the communication session 314. For example, based on the session module 544 receiving a communication mode 248 representing the query communication 254, the communication session 314, or a combination thereof can be established between the first device 102 and the second device 106. Continuing in this example, if the session module 544 does not receive a permission to communicate, the session module 544 can refrain from establishing the communication session 314.

In a different specific example, the session module 544 can establish the communication session 314 based on the communication mode 248 representing the timed communication 256 of FIG. 2. In this specific example, the session module 544 can transmit a request for the instance of time for establishing the communication session 314. For example, the session module 544 can establish the communication session 314 between the first device 102 and the second device 106 when the instance of time retrieved by the session module 544 arrives. For a specific example, the session module 544 can retrieve "2:00 PM" representing the time for establishing the communication information 316. In this specific example, the session module 544 can establish the communication session 314 between the first device 102 and the second device 106 when the time becomes 2:00 PM.

It has been discovered that the navigation system 100 establishing the communication session 314 based on the communication mode 248 representing the timed communication 256 improves the safety and accuracy of communicating the communication information 316. More specifically, by delaying the communication session 314 to the time specified by the user, the navigation system 100 can establish the communication session 314 at the time most suited for the user. For further example, the navigation system 100 significantly improves the capability and operation of the first control unit 412 of FIG. 4, the second control unit 434 of FIG. 2, or a combination thereof to control the execution of whether to establish the communication session 314 based on the timed communication 256. As a result, the navigation system 100 can improve safety by allowing the user to control the timing for establishing the communication session 314 to avoid having a conversation while driving in a hazardous condition, increasing flexibility of allocating computer memory, or a combination thereof.

In another example, the session module 544 can establish the communication session 314 based on the travel time 216. In this example, the session module 544 can initiate the communication session 314 between the first device 102 and the second device 106 at the pre-determined amount of the travel time 216 prior to arriving at the destination location 222. For example, the configuration module 510 can predict the first device 102 to arrive at the destination location 222 at 3:30 PM. In this example, the configuration module 510 can retrieve "20 minutes prior to arrival" as the travel time 216. In this example, the session module 544 can establish the communication session 314 at 3:10 PM since it is "20 minutes prior to arrival" from the predicted arrival time of 3:30 PM.

In another example, the session module 544 can establish the communication session 314 based on the session duration 332. In this example, the session module 544 can establish the communication session 314 between the first device 102 and the second device 106 for the duration of the session duration 332.

In a different example, the session module 544 can communicate the removal 284 of FIG. 2 of the POI 209 as the destination location 222 of the travel route 278. In this example, the session module 544 can generate the cancellation notice 334 of FIG. 3 based on detecting the destination location 222 being removed from the travel route 278. Continuing in this example, the session module 544 can further communicate the cancellation notice 334 to the POI contact 236 of the second device 106 to communicate the removal 284 of the destination location 222.

It has been discovered that the navigation system 100 communicating the cancellation notice 334 automatically based on the removal 284 of the destination location 222 improves the efficiency of operating the first device 102, the navigation system 100, or a combination thereof. By generating the cancellation notice 334 based on the removal 284 of the destination location 222, the navigation system 100 can communicate the user's intent to skip the destination location 222 previously designated as a destination. More specifically as an example, the navigation system 100 significantly improves the capability and operation of the first control unit 412 of FIG. 4, the second control unit 434 of FIG. 2, or a combination thereof to control the execution of whether to communicate the communication notice 334 based on detection of the destination location 222 being removed. As a result, the navigation system 100 can communicate the cancellation notice 334 to improve the efficiency of operating the navigation system 100 by providing the POI 209 with an updated information for determining the number of visitors arriving, increasing flexibility of allocating computer memory, or a combination thereof.

In an alternative example, the session module 544 can communicate the cancellation notice 334 to another other device based on a discrepancy between the estimated arrival time 279 and the POI availability 326 of FIG. 3. In this alternative example, the session module 544 can compare the estimated arrival time 279 and the POI availability 326. Based on determining a discrepancy between the estimated arrival time 279 and the POI availability 326, the session module 544 can generate the cancellation notice 334 and communicate the cancellation notice 334 to the temporary contact 312 for forwarding to another device.

In another example, the session module 544 can establish the communication session 314 based on the travel time 216 meeting or exceeding the communication time threshold 217 of FIG. 2. In this example, the session module 544 can compare the travel time 216 and the communication time threshold 217. Based on the session module 544 determining the travel time 216 meeting or exceeding the communication time threshold 217, the session module 544 can establish the communication session 314 between the first device 102 and the second device 106.

For a specific example, the travel time 216 can be 15 minutes and the communication time threshold 217 can be 20 minutes. Based on the travel time 216 becoming less than the communication time threshold 217, the session module 544 can refrain from establishing the communication session 314 between the first device 102 and the second device 106.

In another specific example, the travel time 216 can be 25 minutes and the communication time threshold 217 can be 20 minutes. Based on the travel time 216 exceeding the communication time threshold 217, the session module 544 can establish the communication session 314 between the first device 102 and the second device 106.

The communication module 540 can include a conversation module 546. The conversation module 546 communicates the natural language conversation 318 of FIG. 3 of the navigation system 100. The conversation module 546 can communicate the natural language conversation 318 in various ways.

For example, the conversation module 546 can determine the communication information 316 by capturing the alphanumeric value of A to Z, 0 to 9, or a combination thereof representing the natural language conversation 318 entered at the first user interface 418, the second user interface 438 of FIG. 4, or a combination thereof. In a different example, the conversation module 546 can retrieve the communication information 316 representing the natural language conversation 318 stored on the first storage unit 414, communicated through the first communication unit 416 from the external source, or a combination thereof.

For a specific example, the conversation module 546 can capture the natural language conversation 318 based on capturing the audio speech, the text chat, the sign language, or combination thereof using natural language processing technique. For example, the conversation module 546 can capture "Is your Starbucks store open 24 hours?" representing the natural language conversation 318.

The communication module 540 can include a transaction module 548. The transaction module 548 communicates the transactional communication 320 of the navigation system 100. The transaction module 548 can communicate the transactional communication 320 in various ways.

For example, the transaction module 548 can capture the transactional communication 320 based on capturing the voice speech, the text chat, the sign language, or combination thereof representing the transactional communication 320 entered at the first user interface 418, the second user interface 438, or a combination thereof. For a specific example, the transaction module 548 can capture "Two ice coffees and one chocolate cookie for pickup" representing the transactional communication 320. Continuing in this specific example, the transaction module 548 can communicate the 2× "ice coffees" and the 1× "chocolate cookie" representing the captured instance of the transactional communication 320.

For a different specific example, the transaction module 548 can retrieve the transactional communication 320 communicated through the first communication interface 428, the second communication interface 450, or a combination thereof to the first device 102, the second device 106, or a combination thereof from the external source. For example, the transaction module 548 can retrieve "3× iced coffee, 1× chocolate cookie, Pickup" representing the transactional communication 320 for a pickup order of three iced coffees and one chocolate cookie using natural language processing technique.

In another example, the transaction module 548 can generate the communication information 316 representing the transactional communication 320 based on the order information 322 of FIG. 3, the inventory information 324 of FIG. 3, the POI availability 326, the reservation information 328 of FIG. 3, or a combination thereof. In this example, the transaction module 548 can aggregate the order information 322, the inventory information 324, the POI availability 326, the reservation information 328, or a combination thereof for generating the transactional communication 320.

In a different example, the transaction module 548 can communicate the transactional communication 320 of FIG. 3 between the first device 102 and the second device 106 through the communication path 104. For example, the transaction module 548 can communicate the "Two ice coffee and one chocolate cookie for pickup" representing an order information 322 of FIG. 3 captured by the first device 102 to the second device 106.

In a specific example, the transaction module 548 can communicate the transactional communication 320 between the first device 102 and the second device 106 based on the privacy preference 306. For example, the transaction module 548 can communicate the transactional communication 320 between the first device 102 and the second device 106 based on the privacy preference 306 representing the identifiable mode 308. In this example, the transaction module 548 can communicate the transactional communication 320 based on transmitting the transactional communication 320 from the device contact 214 of the first device 102 to the POI contact 236 of the second device 106.

In a different example, the transaction module 548 can communicate the transactional communication 320 between the first device 102 and the second device 106 based on forwarding the communication information 316 through the temporary contact 312 based on the privacy preference 306 representing the anonymous mode 310. In this example, the transaction module 548 can communicate the transactional communication 320 between the first device 102 and second device 106 by forwarding the transactional communication 320 through the temporary contact 312. The transaction module 548 can further communicate other instances of the transactional communication 320 including the inventory information 324 of FIG. 3, the POI availability 326 of FIG. 3, the reservation information 328 of FIG. 3, accessory information 330 of FIG. 3, or a combination thereof between devices.

In another example, the transaction module 548 can store the transactional communication 320. The transaction module 548 can store the transactional communication 320 based on storing the communicated instance of the transactional communication 320 in the first storage unit 414, the second storage unit 446, or a combination.

For example, the transaction module 548 can store the transactional communication 320 including the order information 322, the inventory information 324, the reservation information 328, accessory information 330, or a combination thereof communicated through the navigation system 100. In this example, the transaction module 548 can first determine the transactional communication 320 communicated between the first device 102 and the second device 106. Continuing in this example, the transaction module 548 can thereafter store the communicated instance of the transactional communication 320 in the first storage unit 414, the second storage unit 446, or a combination thereof.

The physical transformation from moving from one instance of the physical location 208 to the destination location 222 results in the movement in the physical world, such as the movement by the person carrying the first device 102, the vehicle equipped with the first device 102, or a combination thereof, based on the operation of the navigation system 100. As the movement in the physical world occurs, the movement itself creates additional information that is converted back into determining the current location 212 for the continued operation of the navigation system 100 and to continue the movement in the physical world.

The first software 426 of FIG. 4 of the first device 102 can include the modules for the navigation system 100. For example, the first software 426 can include the configuration module 510, the destination module 520, the route module 530, and the communication module 540.

The first control unit 412 can execute the first software 426 for the configuration module 510 to determine the configuration information 202. The first control unit 412 can execute the first software 426 for the destination module 520 to determine the route information 274 including the destination location 222. The first control unit 412 can execute the first software 426 for the route module 530 to determine the travel route 278. The first control unit 412 can execute the first software 426 for the communication module 540 to communicate the navigation notice 282, the session information 402, the communication information 416, the transaction information 420, or a combination thereof.

The second software 442 of FIG. 4 of the second device 106 of FIG. 4 can include the modules for the navigation system 100. For example, the second software 442 can include the configuration module 510, the destination module 520, the route module 530, and the communication module 540.

The second control unit 434 of FIG. 3 can execute the second software 442 for the configuration module 510 to determine the configuration information 202. The second control unit 434 can execute the second software 442 for the destination module 520 to determine the route information 274 including the destination location 222. The second control unit 434 can execute the second software 442 for the route module 530 to determine the travel route 278. The second control unit 434 can execute the second software 442 for the communication module 540 to communicate the navigation notice 282, the session information 402, the communication information 416, the transaction information 420, or a combination thereof.

The modules of the navigation system 100 can be partitioned between the first software 426 and the second software 442. The second software 442 can include the communication module 540. The second control unit 434 can execute modules partitioned on the second software 442 as previously described.

The first software 426 can include the configuration module 510, the destination module 520, and the route module 530. Based on the size of the first storage unit 314, the first software 426 can include additional modules of the navigation system 100. The first control unit 412 can execute the modules partitioned on the first software 426 as previously described.

The first control unit 412 can operate the first communication interface 428 of FIG. 4 to communicate the navigation notice 282, the session information 402, the communication information 416, the transaction information 420, or a combination thereof to or from the second device 106 through the communication path 104 of FIG. 1. The first control unit 412 can operate the first software 426 to operate the location unit 420 of FIG. 4.

The second control unit 434 can operate the second communication interface 450 of FIG. 4 to communicate the navigation notice 282, the session information 302, the communication information 416, the transaction information 420, or a combination thereof to or from the first device 102 through the communication path 104 of FIG. 1.

The navigation system 100 describes the module functions or order as an example. The modules can be partitioned differently. For example, the configuration module 510, the destination module 520, or a combination thereof can be combined. In another example, the route module 530, the communication module 540, or a combination thereof can be combined. Each of the modules can operate individually and independently of the other modules. Furthermore, data generated in one module can be used by another module without being directly coupled to each other. For example, the configuration module 510 can receive the communication information 416 from the communication module 540. Further, "communicating" can represent sending, receiving, or a combination thereof of the data generated to or from one device to another device.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules.

The modules described in this application can be implemented as instructions stored on a non-transitory computer readable medium to be executed by the first control unit 412, the second control unit 434, or a combination thereof. The non-transitory computer medium can include the first storage unit 414, the second storage unit 446, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
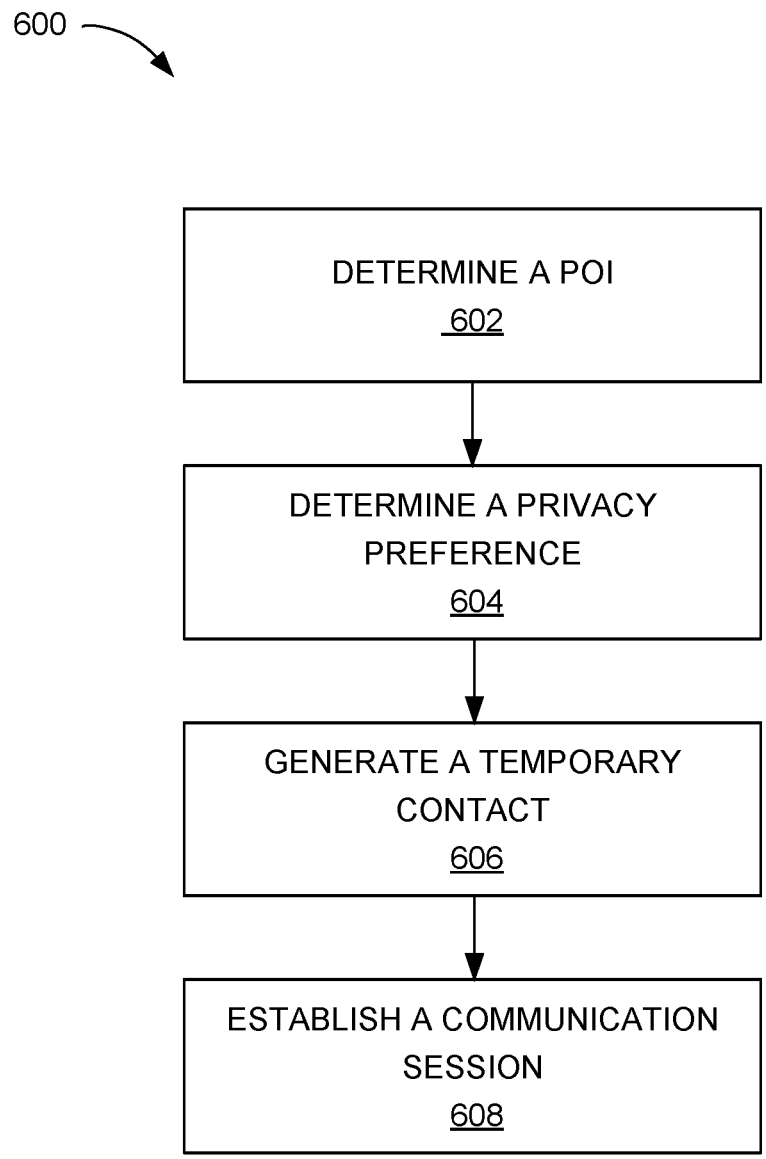
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a POI (point-of-interest) based on comparing a destination description and a POI information for a match in a block 602; determining a privacy preference for communicating with a device in a block 604; generating a temporary contact based on the POI and the privacy preference representing an anonymous mode in a block 606; and establishing a communication session between a contact address and the temporary contact with a control unit based on the privacy preference for communicating with the POI in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   determining a POI (point-of-interest) based on comparing a destination description and a POI information for a match;
   establishing a communication session between a first device and the POI based on a privacy preference representing an anonymous mode; and
   communicating a transactional communication during the communication session, to the POI.

2. The method as claimed in claim 1 wherein establishing the communication session includes establishing the communication session between the first device and the POI through a temporary contact, as a communication proxy.

3. The method as claimed in claim 1 further comprising communicating a navigation notice to the POI based on a transmission permissibility representing a permit notification.

4. The method as claimed in claim 1 further comprising communicating a cancellation notice to the POI based on detecting a removal of the POI from a travel route.

5. The method as claimed in claim 1 further comprising communicating a travel time to the POI.

6. The method as claimed in claim 1 further comprising:
   determining an estimated arrival time based on a travel time according to a travel distance and a predicted speed;
   comparing the estimated arrival time and a time range included in an accessory information for the match; and
   communicating the accessory information matching the estimated arrival time to a temporary contact for forwarding the accessory information to a contact address.

7. The method as claimed in claim 1 further comprising terminating the communication session between the first device and the POI based on a discrepancy between an estimated arrival time and a POI availability.

8. The method as claimed in claim 1 further comprising generating a communication information based on combining an order information, an inventory information, a POI availability, a reservation information, or a combination thereof for communicating between the first device and the POI contact through a temporary contact.

9. The method as claimed in claim 1 wherein generating a temporary contact includes generating the temporary contact for a session duration.

10. The method as claimed in claim 1 wherein establishing the communication session includes establishing the communication session between the first device and the POI through a temporary contact based on a remaining drive time meeting or exceeding a communication time threshold.

11. A navigation system comprising:
    a control unit for:
       determining a POI (point-of-interest) based on comparing a destination description and a POI information for a match,
       establishing a communication session between a first device and the POI based on a privacy preference representing an anonymous mode, and
    a communication unit, coupled to the control unit, for communicating a transactional communication, during the communication session to the POI.

12. The system as claimed in claim 11 wherein the communication unit is for establishing the communication session between the first device and the POI through a temporary contact, as a communication proxy.

13. The system as claimed in claim 11 wherein the communication unit is for communicating a navigation notice to the POI based on a transmission permissibility representing a permit notification.

14. The system as claimed in claim 11 wherein the communication unit is for communicating a cancellation notice to the POI based on detecting a removal of the POI from a travel route.

15. The system as claimed in claim 11 wherein the communication unit is for communicating a travel time to the POI.

16. A non-transitory computer readable medium including instructions for execution, the instructions comprising:
    determining a POI (point-of-interest) based on comparing a destination description and a POI information for a match;
    establishing a communication session between a first device and the POI based on a privacy preference representing an anonymous mode; and
    communicating a transactional communication, during the communication session, to the POI.

17. The non-transitory computer readable medium as claimed in claim 16 wherein establishing the communication session includes establishing the communication session between the first device and the POI through a temporary contact, as a communication proxy.

18. The non-transitory computer readable medium as claimed in claim 16 further comprising communicating a navigation notice to the POI based on a transmission permissibility representing a permit notification.

19. The non-transitory computer readable medium as claimed in claim 16 further comprising communicating a cancellation notice to the POI based on detecting a removal of the POI from a travel route.

20. The non-transitory computer readable medium as claimed in claim 16 further comprising communicating a travel time to the POI.

* * * * *